March 31, 1953 W. ROSS 2,633,368
STABILIZER DEVICE FOR VEHICLES
Filed Jan. 19, 1953
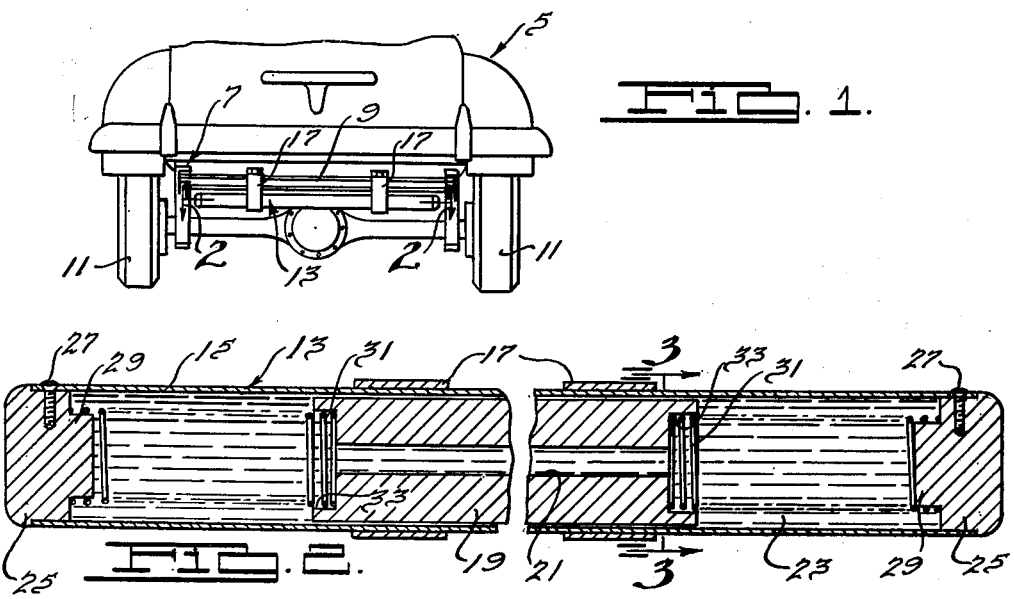
FIG. 1.
FIG. 2.
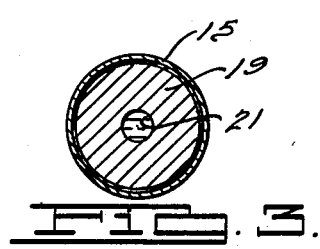
FIG. 3.
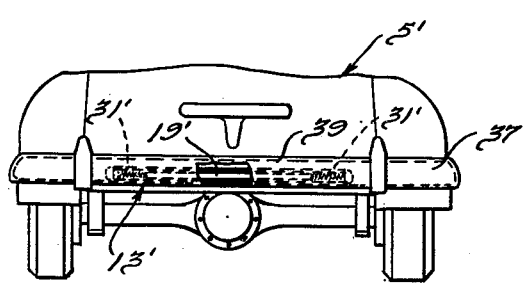
FIG. 4.
INVENTOR.
William Ross
BY
Harness, Dickey & Pierce
ATTORNEYS.

Patented Mar. 31, 1953

2,633,368

UNITED STATES PATENT OFFICE 2,633,368

STABILIZER DEVICE FOR VEHICLES

William Ross, Detroit, Mich., assignor to Gyro Skid-Control Company, Inc., Beverly Hills, Calif., a corporation of California Application January 19, 1953, Serial No. 331,986 In Canada September 17, 1952

8 Claims. (Cl. 280—150)

This invention relates generally to a stabilizer device for vehicles and more particularly to a device for eliminating or at least materially reducing vehicle skidding as well as vehicle vibrations, and is a continuation-in-part of applicant's copending application entitled Stabilizer Device for Vehicles, Serial No. 296,615, filed July 1, 1952, now abandoned.

It is a known fact that a vehicle will skid when the centrifugal force acting laterally thereon is sufficient to overcome the frictional engagement between the vehicle ground engaging wheels and the surface the wheels are engaging. It is furthermore a known fact that a vehicle moving even in a straight forward direction has a certain number of longitudinal vibrations which occur because of the manner in which the vehicle chassis frame is sprung on the ground engaging wheels, the natural frequency of certain of the vehicle parts, and vibrations which occur when the wheels move over the ground. Such vibrations tend to reduce wheel traction or frictional engagement with the ground and can likewise contribute to skidding of the vehicle. The device of this invention is adapted to eliminate or reduce such longitudinal vibrations and to materially reduce any vehicle skidding by effecting a reaction through a spring and weight arrangement, when the vehicle chassis frame moves laterally, to return the vehicle chassis frame to its normal centered position and thus maintain the proper frictional engagement between the wheels and ground surface.

It is therefore an object of this invention to provide a novel safety device for vehicles, which is extremely efficient in action, simple and inexpensive to manufacture, and extremely durable.

It is a further object of this invention to provide a device of the aforementioned type which will not interfere with normal vehicle operation and which can be positioned so as not to affect the appearance of the vehicle.

It is a still further object of this invention to provide a device of the aforementioned type, which may be embodied in a conventional vehicle rear bumper or frame, or otherwise built into the vehicle.

It is a still further object of this invention to provide a device which will materially reduce motor vehicle accidents more than any such device heretofore known.

These and other objects of this invention will become apparent from the following detailed description, taken in conjunction with the accompanying drawing, in which:

Figure 1 is a fragmentary rear elevational view of a motor vehicle having a device of this invention connected therewith;

Fig. 2 is an enlarged sectional view of the structure illustrated in Fig. 1, taken along the line 2—2 thereof;

Fig. 3 is a sectional view of the structure illustrated in Fig. 2, taken along the line 3—3 thereof; and Fig. 4 is a fragmentary rear elevational view of a motor vehicle with parts broken away in section, illustrating the antiskid device of this invention embodied in the rear bumper of the vehicle.

Referring now to the drawing and more particularly to Figure 1, it will be seen that a conventional motor vehicle 5 is illustrated, which includes a chassis frame 7 having a conventional laterally extending cross frame member 9 adjacent the rear thereof. The chassis frame 7 is conventionally sprung on ground engaging vehicle wheels 11, in any suitable manner. The device of this invention is generally indicated at 13 and is connected with the cross frame member 9. The device 13 includes an elongated metallic tubular member 15 which extends below the cross frame member 9 and is connected with the latter through suitable brackets 17. Disposed within the tubular member 13 is a cylindrical weight element 19. The outside diameter of the weight element 19 is slightly less than the inside diameter of the tubular member 15, so that relative lateral movement between the weight and the tubular member can occur. The weight element 19 is provided with a central passageway or aperture 21 extending from one end to the other end thereof and the tubular member is illustrated as containing a lubricating liquid such as a suitable oil or the like 23. The oil 23 is free to flow through the central aperture 21 of the weight element so that no pressure will be built up on either side of the weight element upon relative movement between the tubular member and weight element. The lubricating liquid 23 provides a film between the periphery of the weight element 19 and the inner wall or surface of the tubular member 15, so as to provide suitable means for reducing friction between the weight element and the tubular member, thereby ensuring that relative movement between the weight element and tubular member can readily occur. While other antifriction means may be incorporated within the scope of this invention, to permit this free relative movement, it has been found that the lubricant 23 operates satisfactorily and provides an inexpensive means for reducing friction between the weight and tubular member.

The opposite ends of the tubular member 15 are closed by means of end caps or closure members 25 which may be connected with the tubular member in any suitable manner such as by means of screws 27. The closure members 25 are provided with inwardly projecting hub portions 29 over each of which one end of a coil spring 31 is sleeved so as to abut the adjacent portion of the closure member 25. The opposite end of each spring 31 is disposed in a recess 33 in the adjacent end of the weight element 19. The springs 31 therefore resiliently center the weight element relative to the tubular member.

It has been found that the weight element 19 should have a minimum weight of approximately one per cent of the total weight of the motor vehicle to which it is to be connected or forms a part thereof, and in general this will be between thirty and sixty pounds, depending on the weight of the vehicle. The weight element could, of course, be heavier than the minimum set forth above, but it has been found that the aforementioned weight will operate satisfactorily. It has also been found that with a weight element of this type each of the springs 31 should have a compressive strength per inch greater than the static weight of the element 19. While the compressive strength of the springs 31 may vary with the weight of the element 19, it has been found that with a weight of the aforementioned type the strengh per inch should not exceed one hundred pounds, and the preferable range of spring strengths, where the element 19 weighs approximately one per cent of the vehicle weight, is between approximately forty and approximately ninety pounds per inch. Variable rate springs could, of course, be employed, and such are to be considered within the scope of this invention.

When the vehicle is moving straight forward certain longitudinal or horizontal vibrations inherently occur in the vehicle. With the device of this invention on a vehicle, the weight element 19 will move a limited amount, such as approximately one-half inch, in either direction from its exact center position before further movement is prevented by the compressive strength of the springs. While the weight element contacts the springs at all times, the springs will permit such limited movement and this movement has been found to be sufficient to dampen longitudinal vehicle vibrations and thus eliminate loss of road traction between the vehicle ground engaging wheels and a road surface. The device thus not only reduces undesirable vibrations but maintains better road traction even when the vehicle is moving in a straight forward direction. When the vehicle turns a corner sharply there is a lateral movement of the vehicle chassis frame and a centrifugal force occurs which, if the speed of the vehicle is great enough, overcomes the frictional engagement of the ground engaging wheels 11 with the road surface and causes a skidding of the vehicle. When the device of this invention is on the vehicle and this lateral movement of the chassis frame occurs, the weight element remains substantially stationary while the tubular element 15 is carried laterally by the chassis frame. Thus one of the springs 31 is compressed against the weight element 19 and reacts to urge the chassis frame in the opposite direction from its initial direction of lateral movement. The compressed spring thus effects a reaction which counteracts the lateral movement of the chassis frame in the skid and increases the traction on the ground engaging wheels to prevent additional skidding or the occurrence of a severe or substantial skid. It has been found from substantial experimentation that the reaction of the weight and springs, even though the weight of the element 19 is relatively small compared to the total weight of the vehicle, is sufficient to overcome the loss of wheel traction and prevent or materially reduce skidding of the vehicle.

In the embodiment illustrated in Fig. 4 the antiskid device or stabilizer of this invention is illustrated as being incorporated in the rear bumper 37 of the vehicle. This is accomplished by providing the rear bumper with an intermediate center section 39 which has a tubular portion which replaces the tubular member 15 described above. The weight element and springs 19' and 31' respectively are disposed within the tubular bumper portion 39 and operate in the same manner as previously described. In view of the fact that the bumper is rigidly connected with the chassis frame in a conventional manner, it will thus be seen that the stabilizer device of this invention may be connected with the chassis frame in various manners without departing from the scope of this invention. Furthermore a portion of the vehicle frame may form the tubular element of the device with the weight element and the springs confined therein. That is, the device of this invention may be either attached to a vehicle as an accessory or built into the vehicle as a part thereof.

What is claimed is:

1. A stabilizing device adapted to be connected with a vehicle chassis frame to materially reduce wheel skidding, including an elongated tubular member adapted to extend laterally of the vehicle chassis frame, means for rigidly connecting said tubular member to said vehicle chassis frame, an elongated weight member within said tubular member, having a weight of approximately one per cent of the weight of a vehicle to which the stabilizer is adapted to be connected, friction reducing means between said weight and said tubular member to permit relative sliding movement between said weight member and said tubular member, closure means closing the opposite ends of said tubular member, a coil spring engaging each of said closure means and the adjacent end of said weight member, each of said springs having a compressive strength of not more than ninety pounds per inch.

2. In combination, a vehicle having a chassis frame sprung on ground engaging wheels, said chassis frame including a laterally extending member, a stabilizer and vibration dampening device connected with said chassis frame, said device including a tubular member having its opposite ends closed and extending laterally of said chassis frame, means rigidly connecting said tubular member to said chassis frame member, a weight element supported in said tubular member and having a weight of approximately one per cent of the vehicle weight, spring means engaging the opposite ends of said weight and the adjacent ends of said tubular member to resiliently center said weight in said tubular member, antifriction means between said weight element and said tubular member to permit relatively free movement between said weight element and said tubular member laterally relative to said vehicle, said springs having a strength such that said weight can move approximately one-half inch in either direction from center when the vehicle is moving in a straight forward direction, whereby the weight element will dampen longitudinal vehicle vibrations, said spring strength being such that when the vehicle chassis frame moves laterally said weight will remain substantially stationary, while one of said springs is compressed thereagainst by the movement of said tubular member to thereby effect a reaction to return the chassis frame to its normal center position and maintain effective wheel traction.

3. In combination, a vehicle having a chassis frame sprung on ground engaging wheels, said chassis frame including a laterally extending member, a stabilizer and vibration dampening device connected with said chassis frame, said device including a tubular member having its opposite ends closed and extending laterally of said chassis frame, means rigidly connecting said tubular member to said chassis frame member, a weight element supported in said tubular member for relative sliding movement with said tubular member laterally relative to said vehicle, said weight element having a weight of approximately one per cent of the total weight of the vehicle, springs engaging the opposite ends of said weight and the adjacent ends of said tubular member to resiliently center said weight in said tubular member, said springs having a compressive strength per inch not less than the mass of said weight element and not more than one hundred pounds per inch.

4. A stabilizer device adapted to be connected with a vehicle chassis frame to materially reduce wheel skidding, including an elongated tubular member adapted to extend laterally of the vehicle chassis frame, means for rigidly connecting said tubular member to a vehicle chassis frame, an elongated weight member movably disposed within said tubular member and having an aperture extending longitudinally therethrough, said weight member having a weight of approximately one per cent of the total weight of a vehicle to which the stabilizer is adapted to be connected, closure means closing the opposite ends of said tubular member, spring means disposed between each end of said weight member and its adjacent closure means, for resiliently maintaining said weight member in a central position relative to said tubular member, each of said spring means having a compressive strength per inch not less than the weight of said weight member, the periphery of said weight member being spaced slightly from the inner wall of said tubular member, and a lubricating liquid disposed in said tubular member and providing a lubricating film between said weight member and said tubular member, said weight member aperture being large enough to permit said liquid to flow substantially unrestricted therethrough from one side of the weight member to the other side thereof.

5. A vehicle having a chassis frame sprung on ground engaging wheels, said chassis frame including a laterally extending tubular member, a weight element supported in said tubular member for relative movement with respect thereto and laterally relative to said vehicle, said weight element having a weight of approximately one per cent of the total weight of the vehicle, means on said tubular member providing abutments on opposite sides of said weight element, a spring engaging each end of said weight element and an adjacent abutment, each of said springs having a compressive strength of between approximately forty pounds per inch and approximately ninety pounds per inch.

6. A stabilizing device for the sprung portion of a vehicle, to materially reduce vehicle wheel skidding, including an elongated tubular member adapted to extend laterally of a vehicle and be rigid therewith, an elongated weight element within said tubular member having a weight of approximately one per cent of the weight of a vehicle on which it is adapted to be supported, friction reducing means between said weight element and said tubular member to permit relative movement between said element and said member, closure means closing the opposite ends of said tubular member, a spring engaging each of said closure means and the adjacent end of said weight element, each of said springs having a compressive strength between approximately forty pounds per inch and approximately ninety pounds per inch.

7. A stabilizing device for the sprung portion of a vehicle, to materially reduce vehicle wheel skidding, including an elongated tubular member adapted to extend laterally of a vehicle and be rigid therewith, an elongated weight element within said tubular member weighing between thirty and sixty pounds, friction reducing means between said weight element and said tubular member to permit relative movement between said element and member, abutment means on said tubular member on opposite sides of said weight element, a spring engaging each of said abutment means and the adjacent end of said weight element, each of said springs having a compressive strength of between approximately forty pounds per inch and approximately ninety pounds per inch.

8. A stabilizing device for the sprung portion of a vehicle to materially reduce vehicle wheel skidding, including an elongated tubular member adapted to extend laterally of a vehicle and be rigid therewith, an elongated weight element within said tubular member having a weight of approximately one per cent of the weight of a vehicle on which it is adapted to be supported, friction reducing means between said weight element and said tubular member to permit relative movement between said element and said member, abutment means rigid with said tubular member on opposite sides of said weight element, a spring engaging each of said abutment means and the adjacent end of said weight element, each of said springs having a compressive strength per inch not less than the weight of said weight element.

WILLIAM ROSS.

REFERENCES CITED

The following references are of record in the file of this patent:

UNITED STATES PATENTS

| Number | Name | Date |
|---|---|---|
| 1,783,348 | Taylor | Dec. 2, 1930 |
| 2,545,578 | Hanel | Mar. 20, 1951 |
| 2,618,492 | Singer | Nov. 18, 1952 |

FOREIGN PATENTS

| Number | Country | Date |
|---|---|---|
| 271,285 | Switzerland | Jan. 16, 1951 |
| 481,654 | Great Britain | Mar. 15, 1938 |